(12) United States Patent
Asiri et al.

(10) Patent No.: US 11,204,292 B1
(45) Date of Patent: Dec. 21, 2021

(54) DEFORMABLE PRESSURE SENSOR AND METHODS OF USE THEREOF

(71) Applicant: King Abdulaziz University, Jeddah (SA)

(72) Inventors: Abdullah Mohamed Asiri, Jeddah (SA); Muhammad Tariq Saeed Chani, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/350,253

(22) Filed: Jun. 17, 2021

(51) Int. Cl.
  *G01L 9/00* (2006.01)
  *G01L 1/22* (2006.01)

(52) U.S. Cl.
  CPC .......... *G01L 9/0058* (2013.01); *G01L 1/2293* (2013.01); *G01L 9/0048* (2013.01)

(58) Field of Classification Search
  CPC .... G01L 9/0058; G01L 1/2293; G01L 9/0048
  See application file for complete search history.

(56) References Cited

U.S. PATENT DOCUMENTS

| | | | |
|---|---|---|---|
| 7,992,443 B2 | 8/2011 | Opitz | |
| 8,088,654 B2 | 1/2012 | Kusumoto | |
| 8,752,433 B2 | 6/2014 | Hedtke | |
| 9,534,972 B2 | 1/2017 | Eichhorn | |
| 9,625,330 B2 * | 4/2017 | Park | G01L 1/146 |
| 10,353,506 B2 | 7/2019 | Vosgueritchian | |
| 10,994,387 B1 | 5/2021 | Chani | |
| 2017/0263874 A1 * | 9/2017 | Isogai | C01B 32/174 |
| 2018/0259413 A1 | 9/2018 | Hershey | |

FOREIGN PATENT DOCUMENTS

WO  2012170412  12/2012

* cited by examiner

*Primary Examiner* — Paul M. West
(74) *Attorney, Agent, or Firm* — W&C IP

(57) ABSTRACT

A deformable differential semiconductor sensor system of pressure and/or compressive displacement is provided. The pressure sensor system includes a deformable and elastic rubber substrate, first and second carbon nanotubes conductive layers, metal free phthalocyanine-carbon nanotubes composite semiconductive layers, first and second terminals on the carbon nanotubes conductive layers and a rubber cover for receiving inputs. The conductive and semiconductive layers of the sensor system are embedded in deformable substrates by using rubbing-in technology.

19 Claims, 8 Drawing Sheets

DEFORMABLE PRESSURE SENSOR AND METHODS OF USE THEREOF

FIELD OF THE INVENTION

The disclosure provides a deformable differential semiconductor sensor of pressure and/or compressive displacement. The sensor includes a deformable rubber substrate, first and second carbon nanotubes (CNTs) conductive layers, metal free phthalocyanine-CNTs composite semiconductive layers, at least two terminals and a deformable cover for receiving inputs. The disclosure also provides a method of using such deformable differential semiconductor sensor system for receiving two pressure inputs while generating a single output. The two inputs may include a direct input and a side input.

BACKGROUND

Semiconductor sensors of differential pressure-transmitters (DPT) include various types of force sensors which are used to detect the applied input force [1-2]. Such sensors function by detecting a strain, pressure, displacement, force, stress or deformation in the input surface or a structural layer connected to the input surface. Generally, a decrease in weight and thickness of the electronic device is required, thus the sensor's internal components are often placed very close together. Many electronic devices, such as smart phones, laptop or tablet computers, and kiosks have a display that also functions as a touch sensitive input surface. In addition, flexible pressure sensors have attracted tremendous attention from researchers for their applications in tactile artificial intelligence, electric skin, disease diagnosis, and healthcare monitoring. The use of diaphragm-type silicon sensors for the sensor has been known in the art. Among many silicon-based microsensors, piezoresistive pressure sensors are one of the most well-known application products for the microelectromechanical systems (MEMS) technology. When pressure is applied, the mechanical force on the sensing element results in its deformation, which changes the resistance and electrical output of the sensor. Semiconductor differential pressure measuring device and capacitive differential pressure sensor also have been investigated [3-4]. The independent-excitation of cross-coupled differential-pressure transducers and methods for the measurement of differential pressure using removable (i.e., differential) sensors have been described [5-6]. The sensor used in these devices may be in a solid state and may contain differential pressure-indicator (i.e., electrical visual) [7]. The design of a linear variable differential optical sensor for measuring a small range linear displacement is also described [8].

Further, there has been much interest in developing conductive films that can deform and stretch, while retaining their conductive properties. For example, Takakaluru Sensors (2014) 14:868-876 describes stretchable and flexible carbon nanotubes on natural rubber. These sensors are made by rubbing-in the carbon nanotubes into a surface of the rubber by hand [9]. A dramatically better process whereby carbon nanotubes together with other materials useful for thermoelectric cells such as copper phthalocyanine (CuPc), nickel phthalocyanine (NiPc), p-type bismuth telluride (p-Bi2Te3), poly(3,4-ethylenedioxythiophene)-poly(styrenesulfonate) PEDOT:PSS, and silver paste, are rubbed-in under load to the surface of a rubber material has also been described. The rubbing-in methodology has significant advantages over other technologies such as, for example, U.S. Patent Publication 2017/0052135 to Voiculescu wherein carbon nanotubes are stamped as a pattern conductive electrode onto a pre-stretched silicone layer, and U.S. Patent Publication 2003/0092207 to Yanniv where a carbon nanotube mixture is deposited onto substrate. However, such prior technologies suffer from having a surface coating, rather than a composite like structure where the conductive material is embedded in the surface of the substrate. Although many different types of pressure sensing technologies exist, many of these devices are limited in their applications due to their rigid structure and unavailability to be implemented in compact arrangements for processing multiple inputs.

There is a growing need to provide different and more complex elastic and deformable sensors, which are preferably lightweight and small size and with inherent high gauge factors and low output impedance.

SUMMARY OF THE INVENTION

Aspects of the present disclosure are directed to a differential pressure and displacement sensing system and a method of using such system to determine pressure and compressive displacement. One of the advantageous features of the invention includes a flexibility and stretchability of the pressure sensor system capable of sensing, differentiating and/or generating energy from various mechanical stimuli, including multiple inputs (e.g., two-point input) that are applied on various points on the receiving surface. The sensor system includes a rubber composite substrate and a deformable cover for receiving inputs that are doped with conductive materials (e.g., carbon nanotubes) and/or patterned regions that are doped with both conductive and semiconductive materials (e.g., carbon nanotubes and organic semiconductor metal free phthalocyanine). For fabrication of the conductive and semiconductive layers on the deformable substrate, rubbing-in technology is used. The system is configured to receive two different inputs, a direct input and a side input, to generate one output of resistance and impedance of the sensor, for which the output value either decreases or increases depending on the receiving location of the input. The sensor system of the present invention shows a high sensitivity of resistance and impedance under effects of pressure and displacement.

One aspect of the invention is a deformable differential pressure and displacement sensor system which incorporates two inputs to produce an integrated single output. The preferred embodiments have at least one semiconductive layer which is made from environmentally friendly materials such as organic metal-free phthalocyanine ($H_2Pc$). In preferred embodiments, the deformable sensor system includes a deformable cover configured to receive a plurality of inputs including at least one direct input and at least one side input, wherein the deformable cover is in a cantilevered structure having a supported surface and an unsupported surface, wherein the at least one direct input is applied on the supported surface, and wherein the at least one side input is applied on the unsupported surface; first and second conductive layers of carbon nanotubes; at least two terminals configured to measure a differential pressure where the each terminal is arranged at one end of either the first or second conductive layer of carbon nanotubes; a semiconductive layer composed of a mixture of phthalocyanine and carbon nanotube that is arranged between the first and second conductive layers; and a deformable rubber substrate. The first and second conductive layers and the semiconductive layers are arranged between the deformable cover and the deformable rubber substrate. In some embodiments, the conductive and semiconductive nano or micro powders are embedded in the rubber substrates by rubbing-in technology to provide cost-effective sensors that are built for a shock-proof property.

Another aspect of the disclosure provides a method of using the sensor system as described above. For example, the method includes passing a current through the two conductive layers of the sensor system, receiving two inputs of pressure where each input pressure is applied on a different location on the receiving surface of the sensor system, measuring changes in current in response to a deformation, differentiating or combining and processing the two inputs to produce a single output signal indicative of the applied pressure. The method further includes sensing circuitry and changes in resistance and/or impedance on the sensor due to the direct and side pressure inputs.

Additional features and advantages of the present invention will be set forth in the description of disclosure that follows, and in part will be apparent from the description of may be learned by practice of the disclosure. The disclosure will be realized and attained by the compositions and methods particularly pointed out in the written description and claims hereof.

DETAILED DESCRIPTION

Figure 1:
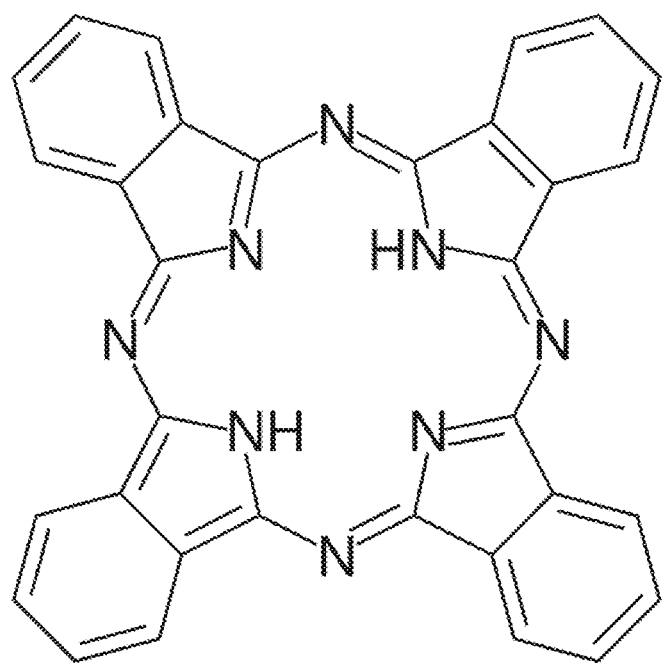
FIG. 1 shows a molecular structure of organic semiconductor metal-free phthalocyanine ($H_2Pc$).

The preferred embodiments of the present disclosure are directed toward a differential pressure sensor system with a deformable substrate containing conductive and semiconductive layers that are capable of processing a lateral pressure input and at least one additional pressure input in a simultaneous or consecutive manner to provide a single output signal. The present disclosure is also directed toward a method of using the differential pressure sensor system to convert multiple pressure stimuli into a single output signal which are then interpreted as beneficial to the intended application.

These and other embodiments are discussed below with references to FIG. 1-8. However, those skilled in the art will readily appreciate that the detailed description given herein with respect to these figures is for explanatory purposes only and should not be construed as limiting.

The term, "differential pressure", as used herein, refers to a pressure which is the difference in pressure between two points. The pressure measurement refers to a commonly used industrial process system. For example, a diaphragm sensor may be used to measure the differential pressure since the deflection of a flexible membrane (i.e., diaphragm) is dependent on the difference in pressure between its two faces. The amount of deflection is separable for known pressures so the pressure can be determined by using calibration. The difference face can be open to atmosphere to measure gauge pressure, open to a second port to measure differential pressure or can be sealed against a vacuum of other fixed reference pressure to measure absolute pressure. In many embodiments, the sensor system may be a strain sensor system that detects displacement such as expansion or contraction of a material of the input receiving layer (i.e., deformable cover). The system may also include a resistance-based strain sensor which measures a resistance of a conductive layer of various shapes and/or between the first and second conductive layers of materials. Further, the sensor system may be a capacitance-based sensor, in which a compressible dielectric (i.e., nonconductive) material may exist between two conductive layers. The term "sensors", as used herein, refers to a tangible and physical structure that includes a plurality of circuitry layers (e.g., conductive or semiconductive layer) and responds to inputs from a physical environment or stimuli in a particular way as dictated by the circuitry. The directed configuration data of the sensor can be in the form of software accessible from a circuit.

In some embodiments, a differential pressure sensor system is configured and arranged for measuring and processing different mechanical stimuli or pressure points including at least one more pressure input (i.e., direct input) that is vertically applied to the input receiving surface of the sensor system where the receiving surface is placed directly above the semiconductive and conductive layers of the system. In addition, the sensor is configured to receive at least one another pressure (i.e., side input) which may be applied on a surface point of the sensor that is lateral to the surface covering the semiconductive layer. In preferred embodiments, a deformable substrate and cover are included to provide flexibility. The sensor system further includes sensor circuitry (i.e., conductive layers) configured to response to the input pressure by sensing a change in impedance due to the two different pressure inputs. The sensor conductive layers may be sensitive to bending or differential forces between the input surface (i.e., deformable cover surface) and the back of the sensor stack. Further, the system may functionally measure forces applied on the sensor system from a side opposite or adjacent to the input surface through the conductive and semiconductive layers. The circuit may include an organic semiconductor substrate and/or other semiconductor material such as inorganic nanowires which are also flexible. In some embodiments, the circuit of the pressure sensor may include carbon-nanotube (CNT) film. In preferred embodiments, metal free phthalocyanine is included. The sensor system of the present disclosure further includes at least two terminals that are configured to measure a differential pressure where each terminal is arranged at one end of either the first or second conductive layer.

Embodiments in accordance with the present disclosure include a semiconductive layer made of CNTs and/or CNT-phthalocyanine mixture embedded on a deformable substrate. The term "substrate", as used herein, refers to an underlying layer of a material or combinations of materials that supports the primary layers (e.g., conductive and semiconductive layers). The substrate materials may include metal or nonmetal natural elements, in this present invention, deformable and flexible materials. In preferred embodiments, phthalocyanine is used. The molecular weight of organic semiconductor metal free phthalocyanine ($C_{32}H_{18}N_8$) is 514.54 Da and the chemical structure of the semiconductor is shown in FIG. 1. In some embodiments, both metal free phthalocyanine and carbon nanotubes may be embedded in the deformable substrate. The deformable substrate may be any material or combination of materials that are compressible and stretchable rubber or similar materials such as silicone, styrene-butadiene rubber, natural rubber, butyl rubber, nitrile rubber, neoprene rubber, ethylene, viton, and combinations thereof. In some applications, a hard rubber, such as styrene-butadiene is preferred.

An exemplary dimension of a deformable substrate used in the present invention (e.g., rubber substrate) may be 2.5×1.5×0.5 $cm^3$. In an exemplary manufacturing process, a portion of the rubber substrate was covered uniformly by mixture of powders of CNTs and phthalocyanine in 1:1 wt. %. In some embodiments, the mixture of CNTs and phthalocyanine may be in 1:3 to 3:1 wt. % to partially or entirely cover the rubber substrate. The phthalocyanine, when in a powder form, may have a mean particle size of 10-22 μm, preferably 11-20 μm or more preferably 13-19 μm. In other embodiments, the mixture of CNTs and phthalocyanine may be placed on the center of the rubber substrate surface. Once the composite is created, the composite is intended to be stretchable, compressible and deformable. Material for the rubber substrate and the thickness of the material may be selected depending on the intended purpose of the pressure sensor. For the preferred embodiments, the thickness of the rubber substrate may be about 0.2-1.5 cm, preferably 0.3-1.2 cm, more preferably 0.5-1 cm. In addition, the rubber-substrate embedded semiconductive layer may have a depth of 22-38 μm, preferably 25-35 μm, more preferably 29-33 μm. U.S. Pat. No. 10,994,387 to Chani, incorporated by reference, describes a method of manufacturing rubber composites with regions doped with conductive material such as carbon nanotubes and/or other conductive and/or semiconductive materials which are created with rubbing-in technology.

The deformable substrate may also serve as a deformable cover for receiving at least two inputs. Thus, the deformable cover may have the identical size and depth of the deformable substrate. An exemplary dimension of a deformable cover used in the present invention (e.g., rubber) may be 2.5×1.5×0.5 $cm^3$. In this case, the deformable cover is also made of any kind of stretchable rubber including styrene-butadiene, rubber, natural rubber, butyl rubber, nitrile rubber, neoprene rubber, ethylene, and viton. The deformable rubber cover may also include conductive powder of carbon nanotubes and/or phthalocyanine powder. The sensor system of the present invention includes two conductive layers of CNTs (i.e., first and second conductive layers). At least one conductive layer of CNTs, the CNTs have a mean diameter of 5-50 nm, preferably 8-40 nm, more preferably 10-30 nm. Alternatively, at least one conductive layer of CNTs may have a mean length of 75-300 nm, preferably 80-250 nm, more preferably 100-200 nm. The depth of the formed rubber substrate embedded CNTs conductive layer may be 6-15 μm, preferably 7-14 μm, more preferably 8-12 μm.

Figure 2:
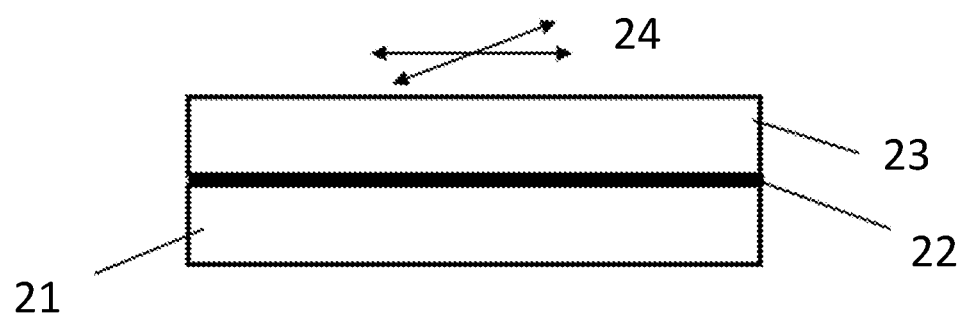
FIG. 2 is a schematic diagram of the sample fabrication by rubbing-in technology with organic semiconductor metal-free phthalocyanine ($H_2Pc$).

In some embodiments, the rubbing-in technology is used to fabricate the rubber embedded CNTs-phthalocyanine semiconductive composite sensor layer. To form the conductive and/or semiconductive layer, the CNTs and/or phthalocyanine powder 23 is poured onto the stretched rubber substrate 21, as shown in FIG. 2. A round or square shaped polished metallic block 23 may be used to rub the powder onto the rubber surface using a mechanism which controls the frequency and direction 24 of the block. In some embodiments, the rubber substrate may be used without pre-stretching. Pre-stretching of the rubber substrate prior to rubbing-in the conductive powder or a mixture of conductive and semiconductive powder enlarges the pores of the rubber and makes the surface more receptive to embedding the conductive material and semiconductive materials. However, the steps of pre-stretching method are complicated and expensive. In preferred embodiments, the pre-stretching step is eliminated by selecting appropriate materials (e.g., organic semiconductor, metal free phthalocyanine, etc.) so that weak Van-der-Waals forces are available between molecules. An appropriate and sufficient pressure known in the art for this procedure may be selected.

The circuit of the pressure sensor can provide an output signal through conductive layers and two terminals embedded in the conductive layers based on pressure applied to the sensor system. In some embodiments, at least two terminals are configured to measure a differential pressure and each terminal is arranged at one end of a single conductive layer. The output can be indicative of an impedance, pressure applied and/or a location of the pressure applied. The circuit can include a first and second layers of conductive electrode and a semiconductive region. For example, the first and second conductive layers can be formed of nanostructures, such as a carbon nanotube film. The system may include a nonconducting region which can be located between the conductive or semiconductive layers and can be formed of silicon, such as a porous polydimethylsiloxane layer or a gap region. The substrate material can deform in response to pressure, resulting in an electrical characteristic (e.g., impedance) at one of the electrodes which can be used as a pressure indication. Certain embodiments implement deformable sensors to include a plurality of layers of different materials. For example, the different layers of materials can include rubber, silicon, nanostructures, porous silicon and/or a gap region formed by rubber or silicon blocks. The deformable materials listed in the disclosure can facilitate stretchability of the sensor system.

Figure 3:
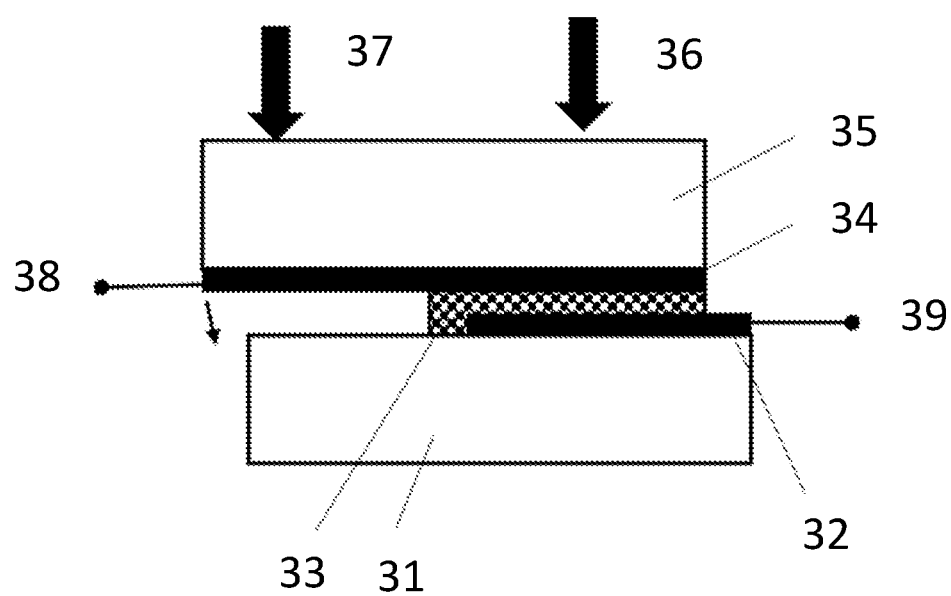
FIG. 3 is a schematic diagram of the fabricated deformable semiconductive sensor of pressure and compressive displacement by rubbing-in technology.

Referring to FIG. 3, a schematic depiction of the pressure sensor system in a multilayer format of any shapes (e.g., rectangular, circular, oval, square, etc.) in accordance with various embodiments is illustrated. The sensor system includes a deformable cover 35, at least one deformable substrate 31, the first and second two conductive layers 32, 34 embedded in at least one deformable substrate or cover for each of the layer, a semiconductive layer composed of phthalocyanine and CNT 33, and at least two terminals 38, 39 configured to measure a differential pressure. The two terminals 38, 39 may be arranged at one end of the either conductive layer. Alternatively, the terminals 38, 39 may be arranged at one end of any layers, as long as the terminals are electrically connected with either of the conductive layer for each. The various layers, especially the deformable substrate and cover, may include rubber, silicon, nanostructures, porous silicon, a gap region created by the substrate and the cover. In preferred embodiments, the deformable cover includes rubber material which further includes a conductive material (e.g., CNTs) embedded on the side surface that faces the deformable rubber substrate. The deformable cover and the deformable rubber substrate may be arranged so that they are in a staggered position. Alternatively, the deformable cover and the deformable substrate may be aligned and have the same length and width. The conductive layers and a semiconductive layer are placed between the two deformable layers (i.e., deformable substrate and deformable cover). On the surface of the rubber substrate facing the deformable cover, only a portion of the surface (e.g., close to the center region) is rubbed on with CNTs and/or phthalocyanine. On one edge of the rubber substrate surface, CNTs is embedded with phthalocyanine, forming two conductive and semiconductive layers in the sensor system. The semiconductive layer may be placed between the two conductive layers that are embedded in either a deformable cover or a deformable rubber substrate. The sensor system may also be in a cantilevered structure with one end fixed by the embedded conductive and semiconductive layers while having a gap or a space filled with air or nonconductive materials between the deformable cover and the substrate. In some embodiments, the embedded semiconductive and/or conductive layer does not cover the entire area of the top surface of the deformable rubber substrate, thus the uncovered space provides a gap between the deformable cover and the substrate. In preferred embodiments, the gap is between the embedded conductive layer on the deformable cover and a surface of the deformable rubber substrate. The gap may be generated on one side surface adjacent to the embedded semiconductive layer. Alternatively, the gap may be on all side surfaces surrounding the edges of the deformable rubber substrate excluding the center surface embedded with conductive and semiconductive layers. In this case, the extended length of the bottom conductive layer 39 is shorter than the full length of the top conductive layer 38. For example, the bottom conductive layer 39 may have an equivalent length of 20-95%, preferably 30-90%, more preferably 40-80% of the top conductive layer. In preferred embodiments, the conductive layer 39 may cover the middle portion (i.e., center) of the deformable rubber substrate.

In some embodiments, the sensor system may include a housing to retain, support and/or enclose various components of the sensor system shown in FIG. 3. At least two inputs of pressure may be received by the deformable rubber cover 35. A direct input 36 may be applied on top surface of the deformable cover in a perpendicular angle to the conductive layer embedded in the deformable substrate. On the other hand, a side input 37 represents the pressure input on top of the surface above the gap created between the deformable cover 35 and the substrate 31. In the preferred embodiments, as shown in FIG. 3, the direct input refers to an input of pressure applied on the supported portion of the cantilevered deformable cover surface. The side input, in these embodiments, refers to a pressure input applied on the surface of the unsupported portion of the cantilevered deformable cover. In some embodiments, both inputs 36, 37 are received near the centerline or near the middle portion (i.e., center surface) of the deformable cover. In some embodiments, the side input 37 may be further away from the center and more towards the edge of the cover (i.e., unsupported end of the cantilevered deformable cover).

Another aspect of the disclosure provides a method of using a sensor system as described above. For example, the method includes passing a current through the two conductive layers of the sensor system, receiving two inputs of pressure applied on a different location of the sensor system (i.e., deformable cover) for each input, measuring changes in current in response to a deformation; and producing a single output signal indicative of the applied pressure. The method further includes sensing circuitry and changes in resistance and/or impedance on the sensor due to the direct and side pressure inputs as well as a step of differentiating the two inputs and/or any other mechanical stimuli. In preferred embodiments, the method includes configuring the sensor system to receive at least one direct input which decreases resistance and impedance of the sensor. In addition, a step of configuring the sensor system to receive at least one side input that increase resistance and impedance of the sensor. The two inputs, direct and lateral (i.e., side) inputs, may be received consecutively or simultaneously to be processed as a single output.

EXAMPLE 1

An exemplary deformable semiconductive layer containing pressure sensor system has a total size dimension of $2.5 \times 1.5 \times 1$ cm$^3$ as shown in FIG. 3. The sensor system is manufactured by rubbing-in method as described previously and designed to bear a range of loads, 0.5-150 gf/cm$^2$, preferably 0.8-120 gf/cm$^2$, more preferably 1-100 g gf/cm$^2$, which may be applied using various rubbing blocks. For the particular sensor system shown in FIG. 3, 10-20 gf/cm$^2$ loads may be applied. In these embodiments, the frequency of the rubbing blocks varies from 10 to 20 Hz. Duration of the sample preparation may be 15-20 seconds on average.

A digital multi-meter MT 4090 LCR was used for the measurement of resistance and impedance at 200 kHz. All experiments were conducted at room temperature conditions. The samples were placed in special chamber when it was required. The pressure or uniaxial compressive displacements were applied along the length of the rectangular prism sample by use of the weights or micrometer mechanism in special experimental arrangement. Processes of application of pressure or compressive forces on the rubber sample are shown in FIG. 3.

Figure 4:
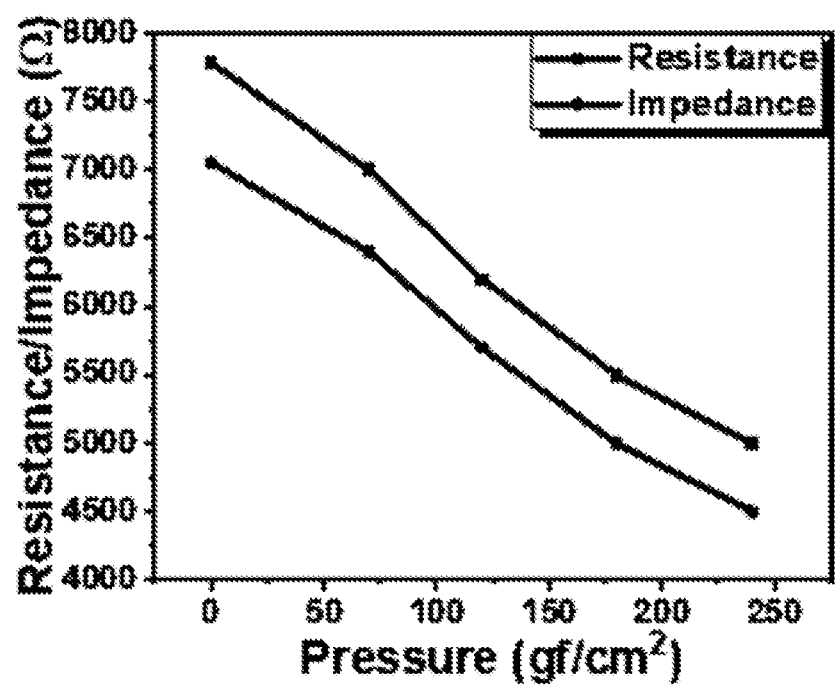
FIG. 4 is a graph showing the resistance and impedance of the rubber, carbon nanotubes and $H_2PC$ sensor on pressure applied to an input surface.

The fabricated sensors were tested by applying pressure or displacement on two points of the sensors (inputs 36, 37 as indicated in FIG. 3). FIG. 4 shows the effect of pressure on the resistance and impedance (at 200 kHz) of the sensor when pressure is applied to input 36 (FIG. 3). Both the impedance and resistance decrease with increasing pressure. The resistance/impedance-pressure relationship shows a near linear behavior. The increase in pressure up to 240 gf/cm$^2$ causes to decrease the resistance and impedance as well up to 1.56 and 1.57 times, accordingly. The rates of decrease in the resistance and impedance can be characterized by the following ratios:

$$\Delta R / \Delta p = -11.6 \, \Omega / (\text{gf/cm}^2) \tag{1}$$

$$\text{and } \Delta Z / \Delta p = -10.6 \, \Omega / (\text{gf/cm}^2) \tag{2}$$

Figure 5:
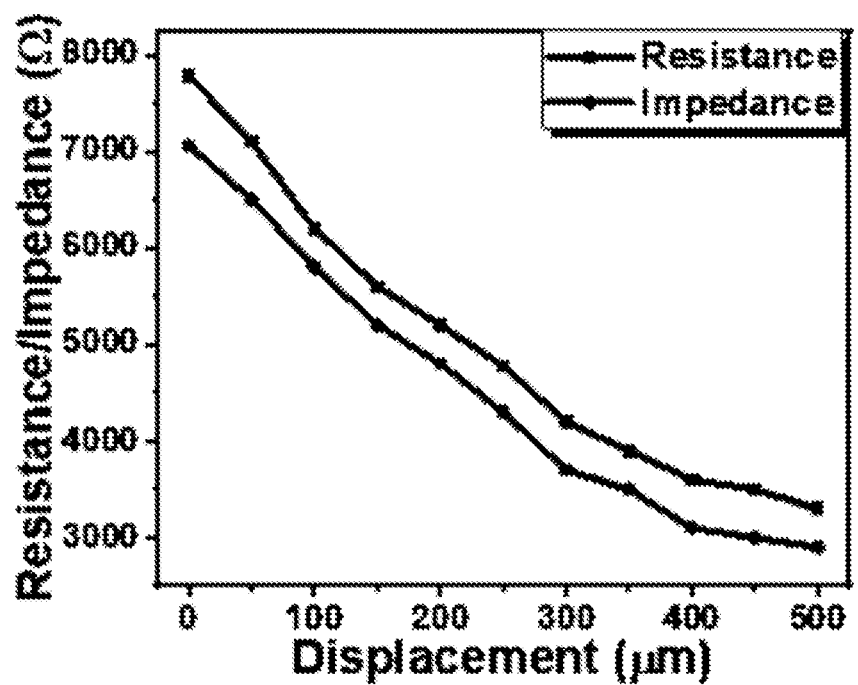
FIG. 5 is a graph showing the resistance and impedance of the rubber, carbon nanotubes and $H_2PC$ sensor on compressive displacement (d) applied to an input surface.

FIG. 5 shows the resistance/impedance-displacement relation of the sensor when the displacement is applied to input 36 (FIG.3). It can be observed that on increasing displacement of both impedance and resistance decrease in a quasi linear fashion. The increase in displacement up to 500 μm bring to decrease in the resistance and impedance as well up to 2.36 and 2.43 times, respectively. The rates of the decrease in resistance and impedance can be characterized by the following ratios:

$$\Delta R / \Delta d = -9.0 \, \Omega / \mu m \tag{3}$$

$$\text{and } \Delta Z / \Delta d = -8.3 \, \Omega / \mu m \tag{4}$$

Figure 6:
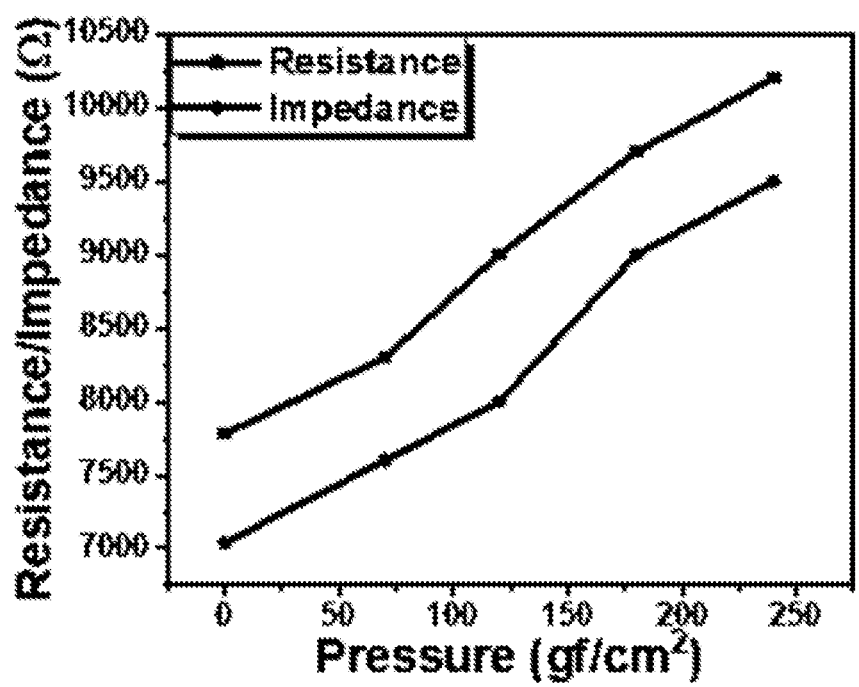
FIG. 6 is a graph showing the resistance and impedance of the rubber, carbon nanotubes and $H_2PC$ sensor on pressure applied to a side input surface.

FIG. 6 illustrates the dependences of the resistance and impedance (at 200 kHz) of the rubber, CNT and H$_2$Pc sensor on pressure when the pressure was applied to input 37. The application of pressure at input 37 causes to increase the resistance and impedance of the sensor. On increasing pressure up to 240 gf/cm², the resistance and impedance increase up to 1.32 and 1.36 times, correspondingly. The rates of the increase of the resistance and impedance can be characterized by the following ratios:

$$\Delta R/\Delta p = 10.1 \ \Omega/(gf/cm^2) \qquad (5)$$

$$\text{and } \Delta Z/\Delta p = 10.3 \ \Omega/(gf/cm^2) \qquad (6)$$

Figure 7:
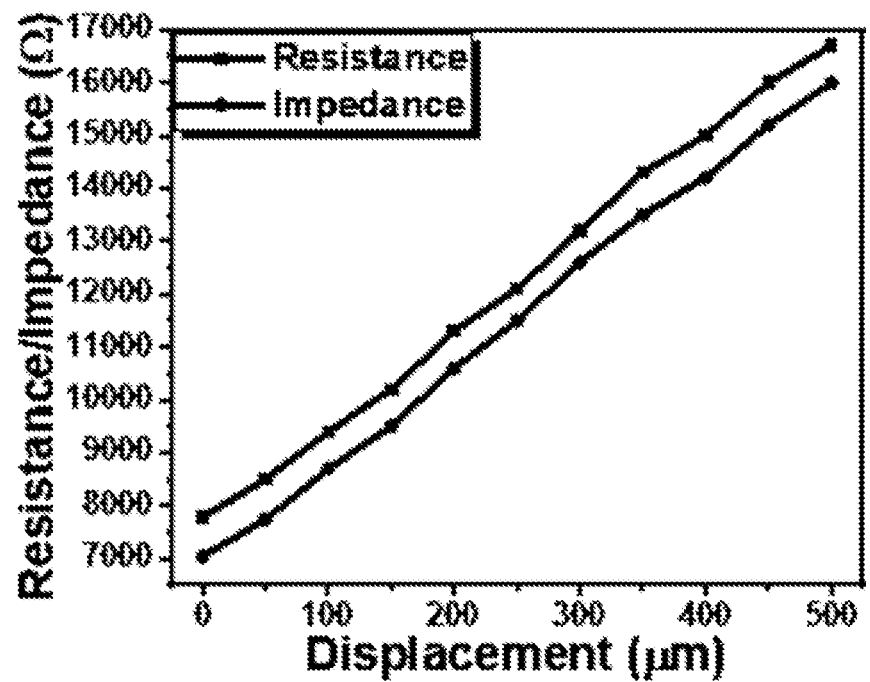
FIG. 7 is a graph showing the resistance and impedance of the rubber, carbon nanotubes and $H_2PC$ sensor on compressive displacement (d) applied to a side input surface.

FIG. 7 illustrates the dependences of the resistance and impedance (at 200 kHz) of the rubber, CNT and $H_2Pc$ composite sensor on compressive displacement when the input is applied at input 37. The compressive displacement at point 37 causes to increase the impedance and resistance as well. As the displacement increases up to 500 μm impedance and the resistance increase by 2.27 and 2.15 times, respectively. The rates of the increase of the resistance and impedance can also be characterized by the following ratios:

$$\Delta R/\Delta d = 17.8 \ \Omega/\mu m \qquad (7)$$

$$\text{and } \Delta Z/\Delta d = 17.9 \Omega/\mu m \qquad (8)$$

Physically the obtained results can be explained by the following way. Under the effect of pressure or compressive displacement at the input 36, the distances between the particles in rubber-CNT-$H_2Pc$ composite decreased, the cross-section of the composite layer (FIG. 3) increased. Moreover, the intermolecular and interatomic distances decreased that bring to decrease in the resistances and impedances that is seen in FIG. 4 and FIG. 5. The opposite phenomenon may take place when pressure or displacement is applied on input 37 that is seen in FIG. 6 and FIG. 7. The sensor is shockproof and can be used for measurement of the pressure and compressive displacement.

Figure 8:
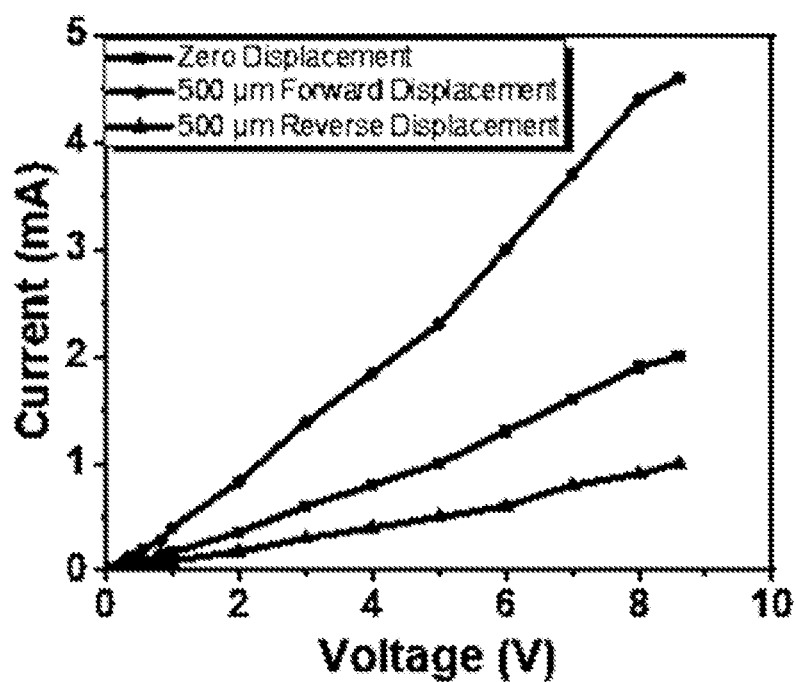
FIG. 8 is a graph showing the characteristics of an exemplary deformable differential semiconductor sensor at different values of displacement.

FIG. 8 shows the current-voltage (I-V) characteristics of the deformable differential semiconductor sensor at different values of displacement: zero displacement d(0), forward displacement (+500 μm) and the reverse displacement (−500 μm). At zero displacement on applying 8.6 V input to the rubber-CNTs-$H_2Pc$ composite based sensor the output current was 2 mA. The forward displacement of 500 μm on the same input voltage (8.6 V) causes to increase the output current up to 4.6 mA, while the reverse displacement of 500 μm cause to decrease output current up to 1.0 mA. The I-V characteristics of the fabricated sensors showed a quasi-linear behavior (FIG. 8).

In the fabricated sensors the rubber-CNTs-$H_2Pc$ composite played the role of, firstly as a sensitive material and secondly, as a resistive material. This behavior is regarded to the much lower conductivity of $H_2Pc$ as compared to the conductivity of the CNT. Due to its higher conductivity, the CNT played the role of contact materials as well. Overall, the resistances of fabricated CNT-(CNT+$H_2Pc$)-CNT sensors were sufficiently high in order to avoid or minimize the experimental errors related to connecting with sensor wires and resistances of CNT layers.

It is to be understood that this invention is not limited to any particular embodiment described herein and may vary. It is also to be understood that the terminology used herein is for the purpose of describing particular embodiments only, and is not intended to be limiting, since the scope of the present invention will be limited only by the appended claims. The terms "front", "back", "bottom", and/or "top" are used herein, unless otherwise noted, merely for convenience of description, and are not limited to any one position or spatial orientation.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.). . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

REFERENCES

[1] Y. Matsuoka, Y. Yamamoto, M. Shimazoe, K. Yamada, Differential Pressure/Pressure Transmitters Applied with Semiconductor Sensors, IEEE Transactions on Industrial Electronics, IE-33(1986) 152-7.

[2] Y. Matsuoka, Y. Yamamoto, T. Tobita, S. Shimada, A. Yasukawa, Design method for sensing body of differential pressure transmitter using silicon diaphragm-type pressure sensor, IEEE Transactions on Instrumentation and Measurement, 44(1995) 791-4.

[3] K. Ikeda, T. Watanabe, S. Fukuhara, T. Yoshida, H. Tsukamoto, Semiconductor differential pressure measuring device, in: U.P. Department (Ed.), US Patents, USA, 1999.

[4] F. Hegner, U. Drewes, A. Rossberg, E. Schmidt, Capacitive differential pressure sensor, in: U.P. Department (Ed.), Google Patents, USA, 2005.
[5] M.J. Clifford, Independent-excitation cross-coupled differential-pressure transducer, UD Patents, USA, 2003.
[6] W. Scholz, A. Vogel, P. Krippner, M. Wetzko, Mechanism for differential pressure measurement with removable differential pressure sensor, in: U. Patents (Ed.), Google Patents, USA, 2003.
[7] B. Mouhebaty, F. A. S. Diaz, D. K. Moscaritolo, Electrical/visual differential pressure indicator with solid state sensor, US Patents, USA, 2005.
[8] T. S. Sarkar, S. Das, B. Chakraborty, Design and development of a linear variable differential optical sensor for small range linear displacement measurement, Int J Res Eng Technol, 2(2013) 480-6.
[9] S. Tadakaluru, W. Thongsuwan, P. Singjai, Stretchable and flexible high-strain sensors made using carbon nanotubes and graphite films on natural rubber, Sensors, 14(2014) 868-76.

What is claimed is:

1. A differential pressure sensor comprising:
    a deformable cover for receiving a plurality of inputs including at least one direct input and at least one side input, wherein the deformable cover is in a cantilevered structure having a supported surface and an unsupported surface, wherein the at least one direct input is applied on the supported surface, and wherein the at least one side input is applied on the unsupported surface;
    a first conductive layer and a second conductive layer made of carbon nanotubes (CNTs);
    at least two terminals configured to measure a differential pressure;
    a semiconductive layer arranged between the first and second conductive layer, wherein the semiconductive layer is a composite of phthalocyanine and CNTs; and
    a deformable rubber substrate, wherein the first and second conductive layers and the semiconductive layer are arranged between the deformable cover and the deformable rubber substrate, and wherein the first conductive layer and the semiconductive layer are embedded in a deformable cover facing surface of the deformable rubber substrate.

2. The differential pressure sensor of claim 1, wherein the embedded first conductive layer covers 40-80% of the deformable cover facing surface of the deformable rubber substrate.

3. The differential pressure sensor of claim 2, wherein the embedded first conductive layer covers a center region of the deformable rubber substrate.

4. The differential pressure sensor of claim 1, wherein the second conductive layer is embedded in a surface of the deformable cover facing the deformable rubber substrate.

5. The differential pressure sensor of claim 4, wherein the second conductive layer covers 80-100% of the deformable cover surface that faces the deformable rubber substrate.

6. The differential pressure sensor of claim 5, further comprising a gap between the embedded second conductive layer on the deformable cover and a surface of the deformable rubber substrate.

7. The differential pressure sensor of claim 6, wherein the gap is adjacent to the semiconductive layer.

8. The differential pressure sensor of claim 1, wherein the semiconductive and the first and second conductive layers are embedded by rubbing-in technology.

9. The differential pressure sensor of claim 8, wherein the CNTs of the first conductive layer and the CNTs of the second conductive layer have a mean diameter of 10 to 30 nm.

10. The differential pressure sensor of claim 8, wherein the CNTs of the first conductive layer and the CNTs of the second conductive layers have a mean length of 100 to 200 nm.

11. The differential pressure sensor of claim 8, wherein the phthalocyanine and CNTs are present in the semiconductive layer at a ratio of 1:1 wt. %.

12. The differential pressure sensor of claim 8, wherein the semiconductive layer has a depth of 29-33 µm.

13. The differential pressure sensor of claim 1, wherein each terminal is arranged at one end of either the first or second conductive layer of CNTs.

14. The differential pressure sensor of claim 1, wherein the direct input decreases resistance and impedance of the sensor.

15. The differential pressure sensor of claim 1, wherein the side input increases resistance and impedance of the sensor.

16. The differential pressure sensor of claim 1, wherein the deformable cover is made of a material selected from silicone, styrene-butadiene rubber, natural rubber, butyl rubber, nitrile rubber, neoprene rubber, ethylene, viton, and combinations thereof.

17. The differential pressure sensor of claim 16, wherein the material is styrene-butadiene rubber.

18. A method of using the differential pressure sensor of claim 1, comprising:
    passing a current through the first and second conductive layers and the semiconductive layer;
    receiving at least two inputs of pressure applied on the deformable cover;
    measuring changes in current in response to a deformation; and
    producing a single output of a differential pressure.

19. The method of claim 18, wherein the at least two inputs include a direct input and a side input.

* * * * *